United States Patent
Condamin et al.

(10) Patent No.: US 10,926,667 B2
(45) Date of Patent: Feb. 23, 2021

(54) TRACK ASSEMBLY

(71) Applicant: Lear Corporation, Southfield, MI (US)

(72) Inventors: Thibaud Condamin, Orliénas (FR); Nordine Hamtache, Roche la Moliere (FR); Antoine Moulin, Aurec-sur-Loire (FR)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 16/399,179

(22) Filed: Apr. 30, 2019

(65) Prior Publication Data

US 2019/0337419 A1 Nov. 7, 2019

Related U.S. Application Data

(63) Continuation-in-part of application No. 16/131,614, filed on Sep. 14, 2018, now Pat. No. 10,850,645.
(Continued)

(30) Foreign Application Priority Data

May 4, 2018 (FR) ..................................... 1853891
May 4, 2018 (FR) ..................................... 1853892
(Continued)

(51) Int. Cl.
*B60N 2/07* (2006.01)
*B60N 2/20* (2006.01)
(Continued)

(52) U.S. Cl.
CPC ......... *B60N 2/0722* (2013.01); *B60N 2/0818* (2013.01); *B60N 2/0843* (2013.01); *B60N 2/20* (2013.01); *B60R 22/22* (2013.01)

(58) Field of Classification Search
CPC ...... B60N 2/0722; B60N 2/20; B60N 2/0818; B60N 2/0843; B60N 2/01541; B60N 2/072; B60R 22/22
(Continued)

(56) References Cited

U.S. PATENT DOCUMENTS 2,126,143 A 8/1938 McGregor
2,263,554 A 11/1941 Brach
(Continued)

FOREIGN PATENT DOCUMENTS

CN 203190203 U 9/2013
CN 203799201 U 8/2014
(Continued)

OTHER PUBLICATIONS

Co-pending U.S. Appl. No. 16/597,187, filed Oct. 9, 2019.
Co-pending U.S. Appl. No. 16/672,989, filed Nov. 4, 2019.
Co-pending U.S. Appl. No. 16/711,661, filed Dec. 12, 2019.

*Primary Examiner* — Muhammad Ijaz
(74) *Attorney, Agent, or Firm* — Fishman Stewart PLLC

(57) ABSTRACT

A track assembly includes a first track, a second track, and a support member. The second track may be disposed substantially in the second track. The lever may be configured to selectively engage the first track and/or the second track to limit longitudinal movement and/or vertical movement of the support member relative to at least one of the first track and the second track. The lever may include a tooth. The tooth may be configured to contact the second track to limit longitudinal movement of the support member along the second track. The tooth may be configured to engage an aperture in the second track. The tooth may be substantially planar and/or may extend in a transverse-vertical plane. The lever may include a hooked portion. The hooked portion may be configured to limit vertical movement of the support member.

20 Claims, 5 Drawing Sheets

Related U.S. Application Data which is a continuation of application No. 16/131,384, filed on Sep. 14, 2018, application No. 16/399,179, which is a continuation-in-part of application No. 16/131,415, filed on Sep. 14, 2018, now Pat. No. 10,562,414, and a continuation-in-part of application No. 16/131,360, filed on Sep. 14, 2018, now Pat. No. 10,759,308, and a continuation-in-part of application No. 16/131,404, filed on Sep. 14, 2018, now Pat. No. 10,850,644.

(30) Foreign Application Priority Data

May 4, 2018 (FR) ...................................... 1853893
May 4, 2018 (FR) ...................................... 1853894

(51) Int. Cl.
*B60N 2/08* (2006.01)
*B60R 22/22* (2006.01)

(58) Field of Classification Search
USPC ............ 248/424, 425, 430, 560, 429, 298.1
See application file for complete search history.

(56) References Cited

U.S. PATENT DOCUMENTS

| | | | |
|---|---|---|---|
| 2,480,622 A | 8/1949 | Warnock | |
| 2,678,082 A * | 5/1954 | Walker | B60N 2/7064 248/624 |
| 3,096,066 A * | 7/1963 | Granet | B60N 2/502 248/562 |
| 3,181,102 A | 4/1965 | Fehr | |
| 3,213,403 A | 10/1965 | Hermann | |
| 3,268,848 A | 8/1966 | Adams | |
| 3,940,182 A | 2/1976 | Tamura | |
| 4,020,769 A | 5/1977 | Keir | |
| 4,198,025 A | 4/1980 | Lowe et al. | |
| 4,238,099 A * | 12/1980 | Hunwicks | B60N 2/0715 248/430 |
| 4,243,248 A | 1/1981 | Scholz et al. | |
| 4,282,631 A * | 8/1981 | Uehara | E05D 15/0665 16/102 |
| 4,511,187 A * | 4/1985 | Rees | B60N 2/0705 248/430 |
| 4,575,295 A | 3/1986 | Rebentisch | |
| 4,618,808 A | 10/1986 | Ish-Shalom et al. | |
| 4,707,030 A | 11/1987 | Harding | |
| 4,711,589 A | 12/1987 | Goodbred | |
| 4,763,360 A | 8/1988 | Daniels et al. | |
| 4,776,809 A | 10/1988 | Hall | |
| 4,830,531 A | 5/1989 | Condit et al. | |
| 4,853,555 A | 8/1989 | Wheat | |
| 4,941,636 A * | 7/1990 | Fujiwara | B60N 2/071 248/419 |
| 4,961,559 A * | 10/1990 | Raymor | B60N 2/0707 248/429 |
| 4,969,621 A | 11/1990 | Munchow et al. | |
| 4,987,316 A | 1/1991 | White et al. | |
| 5,137,331 A | 8/1992 | Colozza | |
| 5,167,393 A * | 12/1992 | Hayakawa | B60N 2/0705 248/430 |
| 5,192,045 A * | 3/1993 | Yamada | B60N 2/071 248/430 |
| 5,222,814 A * | 6/1993 | Boelryk | B60N 2/072 248/430 |
| 5,322,982 A | 6/1994 | Leger et al. | |
| 5,332,290 A | 7/1994 | Borlinghaus et al. | |
| 5,348,373 A | 9/1994 | Stiennon | |
| 5,362,241 A | 11/1994 | Matsuoka et al. | |
| 5,446,442 A | 8/1995 | Swart et al. | |
| 5,466,892 A | 11/1995 | Howard et al. | |
| 5,489,173 A | 2/1996 | Hofle | |
| 5,524,504 A * | 6/1996 | Brandoli | B60N 2/0705 248/429 |
| 5,582,381 A * | 12/1996 | Graf | B60N 2/071 248/430 |
| 5,599,086 A | 2/1997 | Dutta | |
| 5,618,192 A | 4/1997 | Drury | |
| 5,655,816 A | 8/1997 | Magnuson et al. | |
| 5,676,341 A * | 10/1997 | Tarusawa | B60N 2/0705 248/430 |
| 5,696,409 A | 12/1997 | Handman et al. | |
| 5,701,037 A | 12/1997 | Weber et al. | |
| 5,796,177 A | 8/1998 | Werbelow et al. | |
| 5,800,015 A * | 9/1998 | Tsuchiya | B60N 2/0715 248/430 |
| 5,893,545 A * | 4/1999 | Lyons | B60N 2/0705 248/420 |
| 5,899,532 A | 5/1999 | Paisley et al. | |
| 5,918,847 A * | 7/1999 | Couasnon | B60N 2/0705 248/430 |
| 5,921,606 A * | 7/1999 | Moradell | B60N 2/01541 248/429 |
| 5,964,442 A | 10/1999 | Wingblad et al. | |
| 5,964,815 A | 10/1999 | Wallace et al. | |
| 6,036,157 A * | 3/2000 | Baroin | B60N 2/0705 248/429 |
| 6,142,718 A | 11/2000 | Kroll | |
| 6,150,774 A | 11/2000 | Mueller et al. | |
| 6,166,451 A | 12/2000 | Pigott | |
| 6,216,995 B1 | 4/2001 | Koester | |
| 6,227,595 B1 | 5/2001 | Hamelin et al. | |
| 6,260,813 B1 * | 7/2001 | Whitcomb | B64D 11/0696 244/118.6 |
| 6,290,516 B1 | 9/2001 | Gerber | |
| 6,296,498 B1 | 10/2001 | Ross | |
| 6,299,230 B1 | 10/2001 | Oettl | |
| 6,318,802 B1 | 11/2001 | Sjostrom et al. | |
| 6,357,814 B1 * | 3/2002 | Boisset | B60N 2/206 296/65.03 |
| 6,364,272 B1 * | 4/2002 | Schuler | B60N 2/072 248/424 |
| 6,400,259 B1 | 6/2002 | Bourcart et al. | |
| 6,405,988 B1 * | 6/2002 | Taylor | B60N 2/01516 248/429 |
| 6,422,596 B1 | 7/2002 | Fendt et al. | |
| 6,439,531 B1 | 8/2002 | Severini et al. | |
| 6,480,144 B1 | 11/2002 | Miller et al. | |
| 6,693,368 B2 | 2/2004 | Schumann et al. | |
| 6,710,470 B2 | 3/2004 | Bauer et al. | |
| 6,719,350 B2 | 4/2004 | Duchateau et al. | |
| 6,736,458 B2 | 5/2004 | Chabanne et al. | |
| 6,772,056 B2 | 8/2004 | Mattes et al. | |
| 6,805,375 B2 | 10/2004 | Enders et al. | |
| 6,851,708 B2 | 2/2005 | Kazmierczak | |
| 6,882,162 B2 | 4/2005 | Schirmer et al. | |
| 6,960,993 B2 | 11/2005 | Mattes et al. | |
| 7,042,342 B2 | 5/2006 | Luo et al. | |
| 7,083,437 B2 | 8/2006 | Mackness | |
| 7,086,874 B2 | 8/2006 | Mitchell et al. | |
| 7,113,541 B1 | 9/2006 | Lys et al. | |
| 7,159,899 B2 | 1/2007 | Nitschke et al. | |
| 7,170,192 B2 | 1/2007 | Kazmierczak | |
| 7,188,805 B2 | 3/2007 | Henley et al. | |
| 7,207,541 B2 | 4/2007 | Frohnhaus et al. | |
| 7,271,501 B2 | 9/2007 | Dukart et al. | |
| 7,288,009 B2 | 10/2007 | Lawrence et al. | |
| 7,293,831 B2 | 11/2007 | Greene | |
| 7,300,091 B2 | 11/2007 | Nihonmatsu et al. | |
| 7,322,605 B2 | 1/2008 | Ventura et al. | |
| 7,348,687 B2 | 3/2008 | Aichriedler et al. | |
| 7,363,194 B2 | 4/2008 | Schlick et al. | |
| 7,370,831 B2 | 5/2008 | Laib et al. | |
| 7,388,466 B2 | 6/2008 | Ghabra et al. | |
| 7,389,960 B2 | 6/2008 | Mitchell et al. | |
| 7,416,042 B2 | 8/2008 | Czaykowska et al. | |
| 7,434,883 B2 | 10/2008 | Deptolla | |
| 7,454,170 B2 | 11/2008 | Goossens et al. | |
| 7,455,535 B2 | 11/2008 | Insalaco et al. | |
| 7,503,522 B2 | 3/2009 | Henley et al. | |

(56) References Cited

U.S. PATENT DOCUMENTS

| | | | |
|---|---|---|---|
| 7,505,754 B2 | 3/2009 | Kazmierczak et al. | |
| 7,523,913 B2 * | 4/2009 | Mizuno | B60N 2/123 |
| | | | 248/429 |
| 7,556,233 B2 | 7/2009 | Gryp et al. | |
| 7,560,827 B2 | 7/2009 | Jacas-Miret et al. | |
| 7,633,301 B2 | 12/2009 | Steenwyk et al. | |
| 7,661,637 B2 | 2/2010 | Mejuhas et al. | |
| 7,665,939 B1 | 2/2010 | Cardona | |
| 7,739,820 B2 | 6/2010 | Frank | |
| 7,744,386 B1 | 6/2010 | Speidel et al. | |
| 7,980,525 B2 | 7/2011 | Kostin | |
| 7,980,798 B1 | 7/2011 | Kuehn et al. | |
| 8,010,255 B2 | 8/2011 | Darraba | |
| 8,146,991 B2 | 4/2012 | Stan et al. | |
| 8,278,840 B2 | 10/2012 | Logiudice et al. | |
| 8,282,326 B2 | 10/2012 | Krostue et al. | |
| 8,376,675 B2 | 2/2013 | Schulze et al. | |
| 8,463,501 B2 | 6/2013 | Jousse | |
| 8,536,928 B1 | 9/2013 | Gagne et al. | |
| 8,648,613 B2 | 2/2014 | Ewerhart et al. | |
| 8,702,170 B2 | 4/2014 | Abraham et al. | |
| 8,757,578 B2 * | 6/2014 | Kitamura | B60N 2/07 |
| | | | 248/430 |
| 8,757,720 B2 | 6/2014 | Hurst, III et al. | |
| 8,800,949 B2 | 8/2014 | Schebaum et al. | |
| 8,857,778 B2 | 10/2014 | Nonomiya | |
| 8,936,526 B2 | 1/2015 | Boutouil et al. | |
| 8,967,719 B2 | 3/2015 | Ngiau et al. | |
| RE45,456 E | 4/2015 | Sinclair et al. | |
| 9,010,712 B2 * | 4/2015 | Gray | B60N 2/12 |
| | | | 248/429 |
| 9,018,869 B2 | 4/2015 | Yuasa et al. | |
| 9,045,061 B2 | 6/2015 | Kostin et al. | |
| 9,162,590 B2 | 10/2015 | Nagura et al. | |
| 9,174,604 B2 | 11/2015 | Wellhoefer et al. | |
| 9,242,580 B2 | 1/2016 | Schebaum et al. | |
| 9,318,922 B2 | 4/2016 | Hall et al. | |
| 9,340,125 B2 | 5/2016 | Stutika et al. | |
| 9,346,428 B2 | 5/2016 | Bortolin | |
| 9,422,058 B2 | 8/2016 | Fischer et al. | |
| 9,561,770 B2 | 2/2017 | Sievers et al. | |
| 9,592,748 B2 * | 3/2017 | Gordeenko | B60N 2/366 |
| 9,610,862 B2 | 4/2017 | Bonk et al. | |
| 9,663,232 B1 | 5/2017 | Porter et al. | |
| 9,673,583 B2 | 6/2017 | Hudson et al. | |
| 9,701,217 B2 * | 7/2017 | Eckenroth | B60N 2/072 |
| 9,731,628 B1 | 8/2017 | Rao et al. | |
| 9,758,061 B2 | 9/2017 | Pluta et al. | |
| 9,789,834 B2 | 10/2017 | Rapp et al. | |
| 9,796,304 B2 | 10/2017 | Salter et al. | |
| 9,815,425 B2 | 11/2017 | Rao et al. | |
| 9,821,681 B2 | 11/2017 | Rao et al. | |
| 9,840,220 B2 | 12/2017 | Van Buskirk et al. | |
| 9,879,458 B2 * | 1/2018 | Gabriel | E05D 15/063 |
| 9,919,624 B2 | 3/2018 | Cziomer et al. | |
| 9,950,682 B1 | 4/2018 | Gramenos et al. | |
| 10,059,232 B2 | 8/2018 | Frye et al. | |
| 10,160,351 B2 | 12/2018 | Sugimoto et al. | |
| 10,220,731 B2 * | 3/2019 | Kume | B60N 2/0715 |
| 10,479,227 B2 | 11/2019 | Nolte et al. | |
| 10,493,243 B1 | 12/2019 | Braham | |
| 10,547,135 B2 | 1/2020 | Sugiura | |
| 10,549,659 B2 | 2/2020 | Sullivan et al. | |
| 10,654,378 B2 | 5/2020 | Pons | |
| 2005/0046367 A1 | 3/2005 | Wevers et al. | |
| 2005/0089367 A1 | 4/2005 | Sempliner | |
| 2005/0150705 A1 | 7/2005 | Vincent et al. | |
| 2005/0211835 A1 | 9/2005 | Henley et al. | |
| 2005/0215098 A1 | 9/2005 | Muramatsu et al. | |
| 2005/0230543 A1 | 10/2005 | Laib et al. | |
| 2005/0258676 A1 | 11/2005 | Mitchell et al. | |
| 2006/0131470 A1 * | 6/2006 | Yamada | B60N 2/0705 |
| | | | 248/424 |
| 2006/0208549 A1 | 9/2006 | Hancock et al. | |
| 2006/0220411 A1 | 10/2006 | Pathak et al. | |
| 2008/0021602 A1 | 1/2008 | Kingham et al. | |
| 2008/0084085 A1 | 4/2008 | Mizuno et al. | |
| 2008/0090432 A1 | 4/2008 | Patterson et al. | |
| 2009/0014584 A1 | 1/2009 | Rudduck et al. | |
| 2009/0129105 A1 | 5/2009 | Kusu et al. | |
| 2009/0251920 A1 | 10/2009 | Kino et al. | |
| 2009/0302665 A1 | 12/2009 | Dowty | |
| 2009/0319212 A1 | 12/2009 | Cech et al. | |
| 2010/0117275 A1 * | 5/2010 | Nakamura | E02F 9/166 |
| | | | 267/133 |
| 2011/0024595 A1 | 2/2011 | Oi et al. | |
| 2012/0112032 A1 * | 5/2012 | Kohen | B60N 2/24 |
| | | | 248/430 |
| 2013/0020459 A1 * | 1/2013 | Moriyama | B60N 2/01 |
| | | | 248/636 |
| 2013/0035994 A1 | 2/2013 | Pattan et al. | |
| 2013/0341479 A1 * | 12/2013 | Yamada | F16C 33/412 |
| | | | 248/430 |
| 2014/0224954 A1 * | 8/2014 | Oh | B60N 2/0705 |
| | | | 248/429 |
| 2014/0263920 A1 * | 9/2014 | Anticuar | B60N 2/0715 |
| | | | 248/429 |
| 2014/0265479 A1 | 9/2014 | Bennett | |
| 2015/0048206 A1 | 2/2015 | Deloubes | |
| 2015/0052819 A1 * | 2/2015 | Lee | E05D 15/0665 |
| | | | 49/420 |
| 2015/0069807 A1 | 3/2015 | Kienke | |
| 2015/0083882 A1 | 3/2015 | Stutika et al. | |
| 2015/0191106 A1 | 7/2015 | Inoue et al. | |
| 2015/0236462 A1 | 8/2015 | Davidson, Jr. et al. | |
| 2015/0298580 A1 * | 10/2015 | Kanai | B60N 2/0722 |
| | | | 248/430 |
| 2016/0039314 A1 | 2/2016 | Anticuar et al. | |
| 2016/0154170 A1 | 6/2016 | Thompson et al. | |
| 2016/0236613 A1 | 8/2016 | Trier | |
| 2017/0080825 A1 | 3/2017 | Bonk et al. | |
| 2017/0080826 A1 | 3/2017 | Bonk et al. | |
| 2017/0166093 A1 | 6/2017 | Cziomer et al. | |
| 2017/0261343 A1 | 9/2017 | Lanter et al. | |
| 2017/0291507 A1 | 10/2017 | Hattori et al. | |
| 2018/0017189 A1 | 1/2018 | Wegner | |
| 2018/0039917 A1 | 2/2018 | Buttolo et al. | |
| 2018/0058122 A1 * | 3/2018 | Lang | E05D 15/0669 |
| 2018/0086230 A1 * | 3/2018 | Kume | B60N 2/0715 |
| 2018/0086232 A1 * | 3/2018 | Kume | B60N 2/0707 |
| 2018/0105072 A1 | 4/2018 | Pons | |
| 2018/0126875 A1 * | 5/2018 | Kume | B60N 2/08 |
| 2018/0148011 A1 | 5/2018 | Zaugg et al. | |
| 2018/0183623 A1 | 6/2018 | Schoenfeld et al. | |
| 2018/0275648 A1 | 9/2018 | Ramalingam | |
| 2019/0001846 A1 | 1/2019 | Jackson et al. | |
| 2019/0084453 A1 | 3/2019 | Petit et al. | |
| 2019/0126786 A1 | 5/2019 | Dry et al. | |
| 2019/0337413 A1 | 11/2019 | Romer | |
| 2019/0337414 A1 | 11/2019 | Condamin et al. | |
| 2019/0337415 A1 | 11/2019 | Condamin et al. | |
| 2019/0337416 A1 | 11/2019 | Condamin et al. | |
| 2019/0337417 A1 | 11/2019 | Condamin et al. | |
| 2019/0337418 A1 | 11/2019 | Condamin et al. | |
| 2019/0337419 A1 * | 11/2019 | Condamin | B60N 2/0843 |
| 2019/0337420 A1 | 11/2019 | Condamin et al. | |
| 2019/0337421 A1 | 11/2019 | Condamin et al. | |
| 2019/0337422 A1 * | 11/2019 | Condamin | B60N 2/0722 |
| 2019/0337471 A1 | 11/2019 | Brehm | |
| 2019/0379187 A1 | 12/2019 | Christensen et al. | |
| 2019/0389336 A1 | 12/2019 | Malinowski et al. | |
| 2020/0009995 A1 | 1/2020 | Sonar | |
| 2020/0010001 A1 * | 1/2020 | Pinkelman | B60N 2/544 |
| 2020/0055423 A1 | 2/2020 | Prozzi et al. | |
| 2020/0079244 A1 * | 3/2020 | Carbone | B60N 2/005 |
| 2020/0180516 A1 | 6/2020 | Moulin | |
| 2020/0180517 A1 | 6/2020 | Moulin | |
| 2020/0189504 A1 | 6/2020 | Ricart et al. | |
| 2020/0189511 A1 | 6/2020 | Ricart et al. | |
| 2020/0194936 A1 | 6/2020 | Ricart et al. | |
| 2020/0194948 A1 | 6/2020 | Lammers et al. | |
| 2020/0207241 A1 | 7/2020 | Moulin et al. | |
| 2020/0262367 A1 | 8/2020 | Fernandez Banares et al. | |

(56) References Cited

U.S. PATENT DOCUMENTS

| | | | |
|---|---|---|---|
| 2020/0269754 A1* | 8/2020 | Ricart | B60N 2/0244 |
| 2020/0282871 A1 | 9/2020 | Ricart et al. | |
| 2020/0282880 A1 | 9/2020 | Jones et al. | |

FOREIGN PATENT DOCUMENTS

| | | | |
|---|---|---|---|
| DE | 3710476 A1 | 10/1987 |
| DE | 29712180 U1 | 9/1997 |
| DE | 202005013714 U1 | 12/2005 |
| DE | 102005007430 A1 | 3/2006 |
| DE | 102006022032 A1 | 12/2006 |
| DE | 102010017038 A1 | 2/2011 |
| DE | 102010063615 A1 | 2/2012 |
| DE | 102011056278 A1 | 2/2013 |
| DE | 202014102336 U1 | 6/2014 |
| DE | 102014217754 A1 | 3/2015 |
| DE | 102015212100 A1 | 12/2015 |
| DE | 112015000380 T5 | 10/2016 |
| DE | 102016113409 A1 | 4/2017 |
| EP | 0565973 A1 | 10/1993 |
| EP | 0783990 A1 | 7/1997 |
| EP | 1176047 A1 | 1/2002 |
| EP | 1209024 A1 | 5/2002 |
| EP | 1431104 A2 | 5/2004 |
| EP | 2298609 B1 | 3/2011 |
| EP | 1699661 B1 | 8/2012 |
| EP | 3150426 A1 | 4/2017 |
| FR | 2762814 A1 | 11/1998 |
| FR | 2864481 B1 | 4/2006 |
| FR | 2951329 A1 | 4/2011 |
| FR | 2986751 A1 | 8/2013 |
| JP | 3314591 B2 | 8/2002 |
| JP | 2003227703 A | 8/2003 |
| JP | 2005119518 A | 5/2005 |
| JP | 2007112174 A | 5/2007 |
| JP | 2008158578 A | 7/2008 |
| JP | 4222262 B2 | 2/2009 |
| JP | 2013230721 A | 11/2013 |
| WO | 01/87665 A1 | 11/2001 |
| WO | 2003002256 A2 | 1/2003 |
| WO | 2004098943 A1 | 11/2004 |
| WO | 2005068247 A2 | 7/2005 |

* cited by examiner

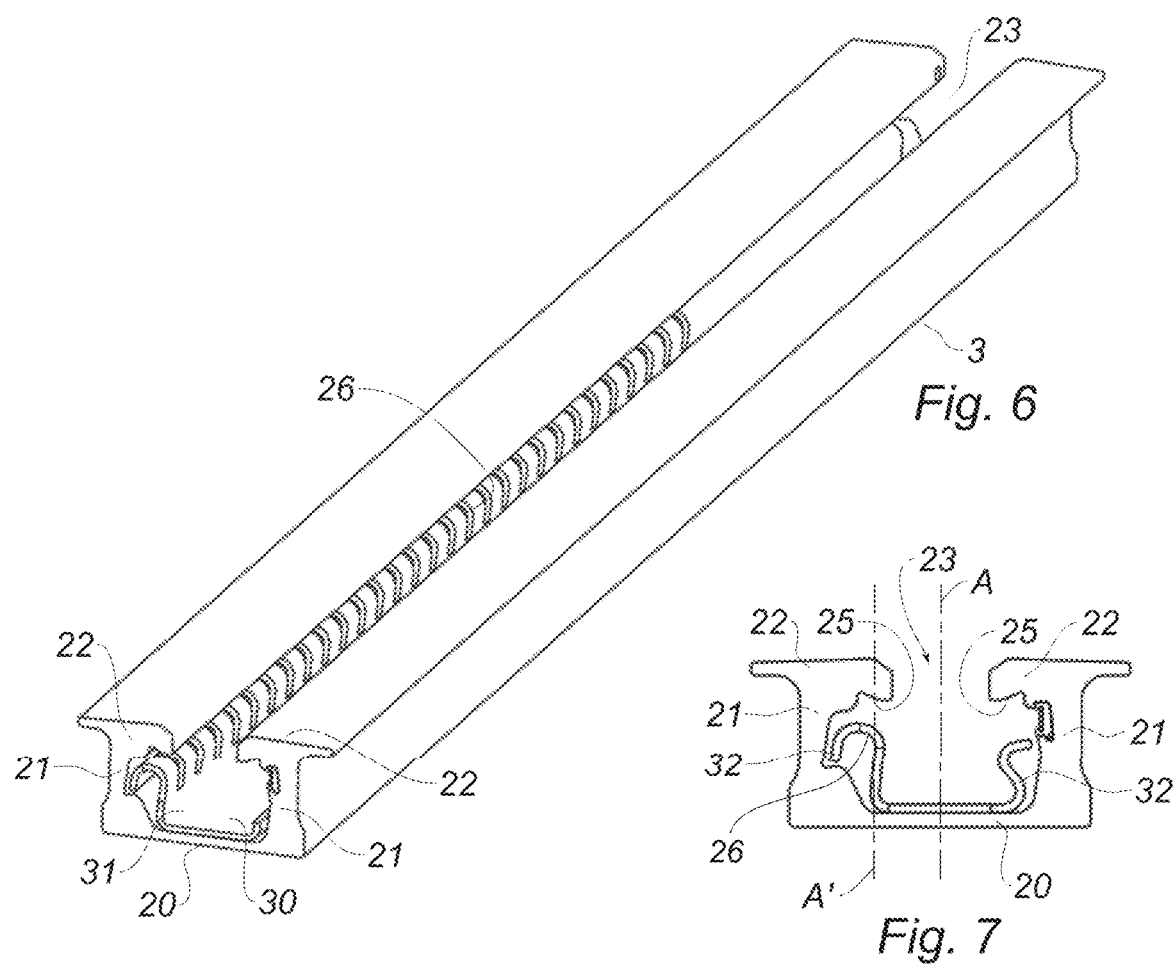
Fig. 6
Fig. 7
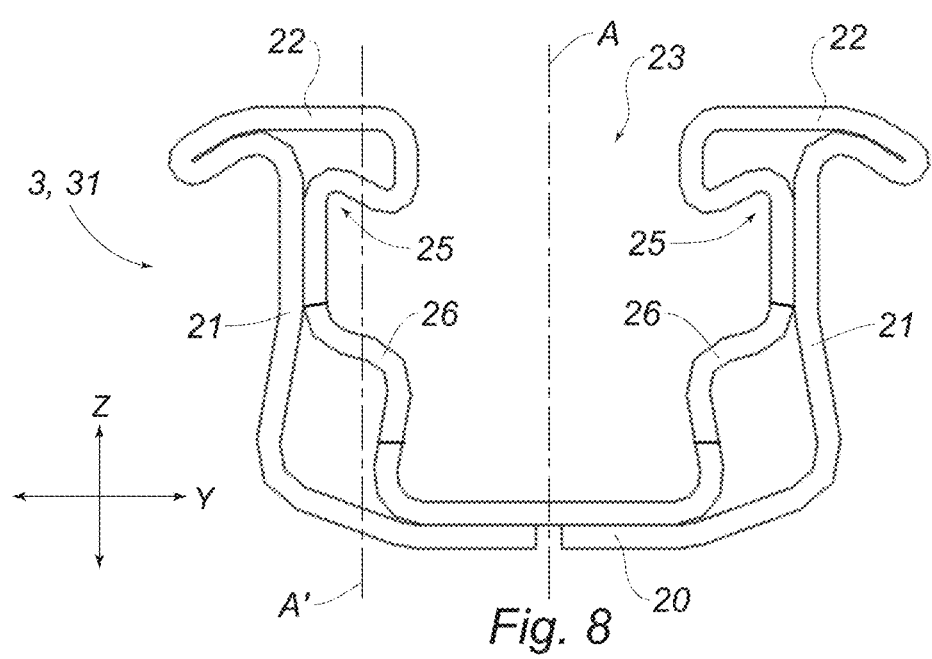
Fig. 8

TRACK ASSEMBLY

CROSS-REFERENCE TO RELATED APPLICATIONS

This application is a continuation-in-part of U.S. patent application Ser. No. 16/131,360, filed Sep. 14, 2018, U.S. patent application Ser. No. 16/131,415, filed Sep. 14, 2018, U.S. patent application Ser. No. 16/131,404, filed Sep. 14, 2018, and U.S. patent application Ser. No. 16/131,614, filed Sep. 14, 2018, which is a continuation of U.S. patent application Ser. No. 16/131,384, filed Sep. 14, 2018, the disclosures of which are all hereby incorporated herein by reference in their entireties.

This application claims the benefit of French Patent Application Serial No. 1853891, filed on May 4, 2018; French Patent Application Serial No. 1853892, filed on May 4, 2018; French Patent Application Serial No. 1853893, filed on May 4, 2018; and French Patent Application Serial No. 1853894, filed on May 4, 2018; the disclosures of which are all hereby incorporated herein by reference in their entireties.

TECHNICAL FIELD

The present disclosure generally relates to track assemblies, including track assemblies that may be used in connection with vehicles.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Some track assemblies may be relatively complex to use and/or to assemble. For example, track assemblies may involve a complex process and may include many different steps and components. Some track assemblies may not be configured for removably connecting a component or seat to a track.

There is a desire for solutions/options that minimize or eliminate one or more challenges or shortcomings of track assemblies. The foregoing discussion is intended only to illustrate examples of the present field and should not be taken as a disavowal of scope.

SUMMARY

The foregoing and other aspects, features, details, utilities, and/or advantages of embodiments of the present disclosure will be apparent from reading the following description, and from reviewing the accompanying drawings.

In embodiments, A track assembly may include a first track, a second track, and/or a support member. The second track may be disposed substantially in the second track. The lever may be configured to selectively engage the first track and/or the second track to limit longitudinal movement and/or vertical movement of the support member relative to at least one of the first track and the second track. The first track may include a wing. The second track may include an aperture configured to at least partially receive the lever. The wing and the aperture may be at least partially aligned in a vertical direction. The lever may include a tooth. The tooth may be configured to contact the second track to limit longitudinal movement of the support member along the second track. The tooth may be configured to engage an aperture in the second track. The tooth may be substantially planar and/or may extend in a transverse-vertical plane. The lever may include a hooked portion. The hooked portion may be configured to limit vertical movement of the support member.

With embodiments, the lever may include a first position and/or a second position. In the first second position of the lever, the lever may be configured to limit longitudinal movement of the support member. In the first position of the lever, the lever may not substantially limit longitudinal movement of the support member. In the second position of the lever, the lever may be configured to limit vertical movement of the support member. In the second position of the lever, the lever may not substantially limit vertical movement of the support member.

In embodiments, the track assembly may include a slider. The slider may be configured to move longitudinally into contact with the lever to selectively limit substantial vertical and/or longitudinal movement of the support member via the lever. The lever may be configured to contact the first track and/or the second track. The lever may include a hooked portion that may be configured to contact the first track and/or limit vertical movement of the support member. The lever may include a tooth that may be configured to contact the second track and/or limit longitudinal movement of the support member.

With embodiments, the lever may include a first position and/or a second position. In the second position of the lever, the lever may limit vertical movement and/or longitudinal movement of the support member relative to the first track and/or the second track. In the first position of the lever, the lever may not substantially limit vertical movement and/or longitudinal movement of the support member relative to the first track and/or the second track. The lever may include a protrusion, and/or the slider may be configured to move longitudinally to contact the protrusion and/or rotate the lever about a longitudinal axis. The slider may include an aperture, and/or the protrusion may be configured to contact the apertures when rotating between the first position and the second position. In the second position of the lever, a vertical gap may be disposed between the hooked portion of the lever and/or the first track. The second track may include a plurality of apertures, and/or the lever may include a plurality of teeth. At least one aperture of the plurality of apertures may be configured such that a tooth of the plurality of teeth may move vertically and/or transversely through the aperture. In the first second position of the lever, at least a portion of the lever may be disposed vertically between the first track and/or the second track.

BRIEF DESCRIPTION OF THE DRAWINGS

FIG. 6 is a perspective view of an embodiment of a first track and a second track according to teachings of the present disclosure.

FIG. 7 is a side view of an embodiment of a first track and a second track according to teachings of the present disclosure.

FIG. 8 is a side view of an embodiment of a combined first track and second track according to teachings of the present disclosure.

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they are not intended to limit the present disclosure to these embodiments and/or examples. On the contrary, the present disclosure is intended to cover alternatives, modifications, and equivalents.

Figure 1:
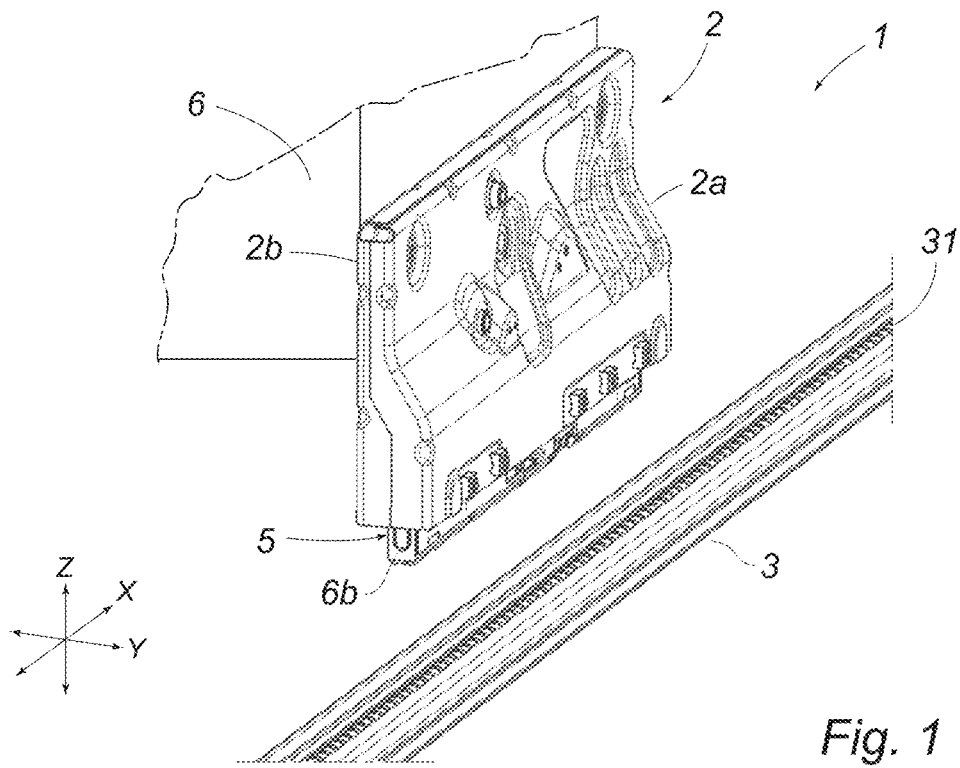
FIGS. 1 and 2 are perspective views of embodiments of a track assembly according to teachings of the present disclosure
Figure 2:
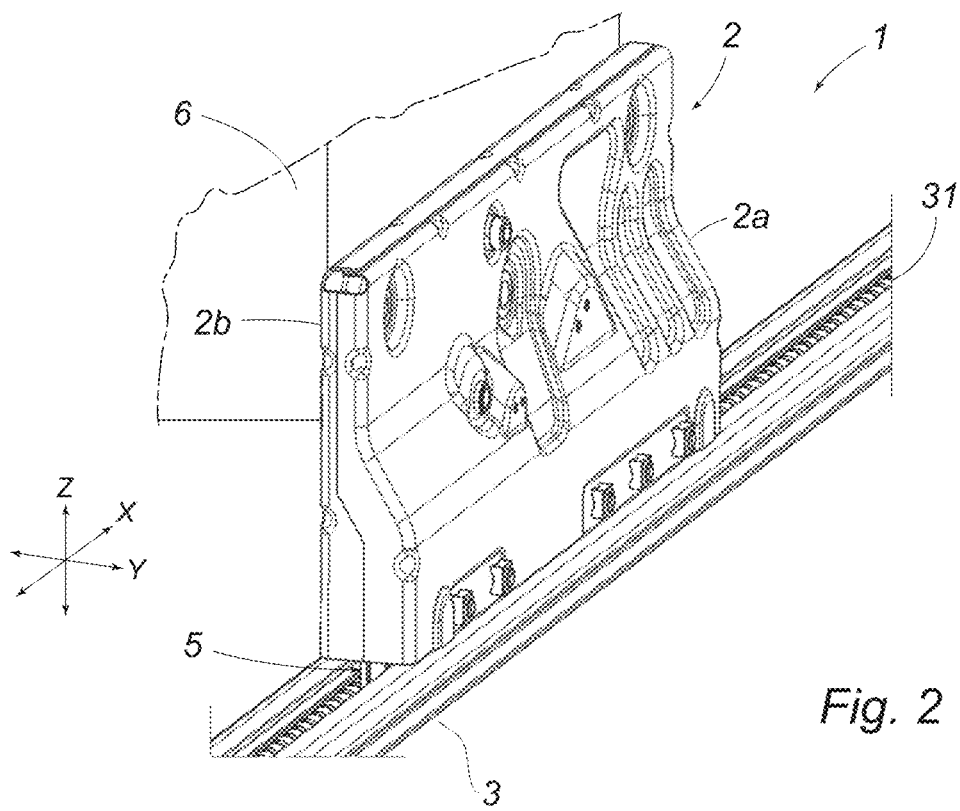
Figure 3:
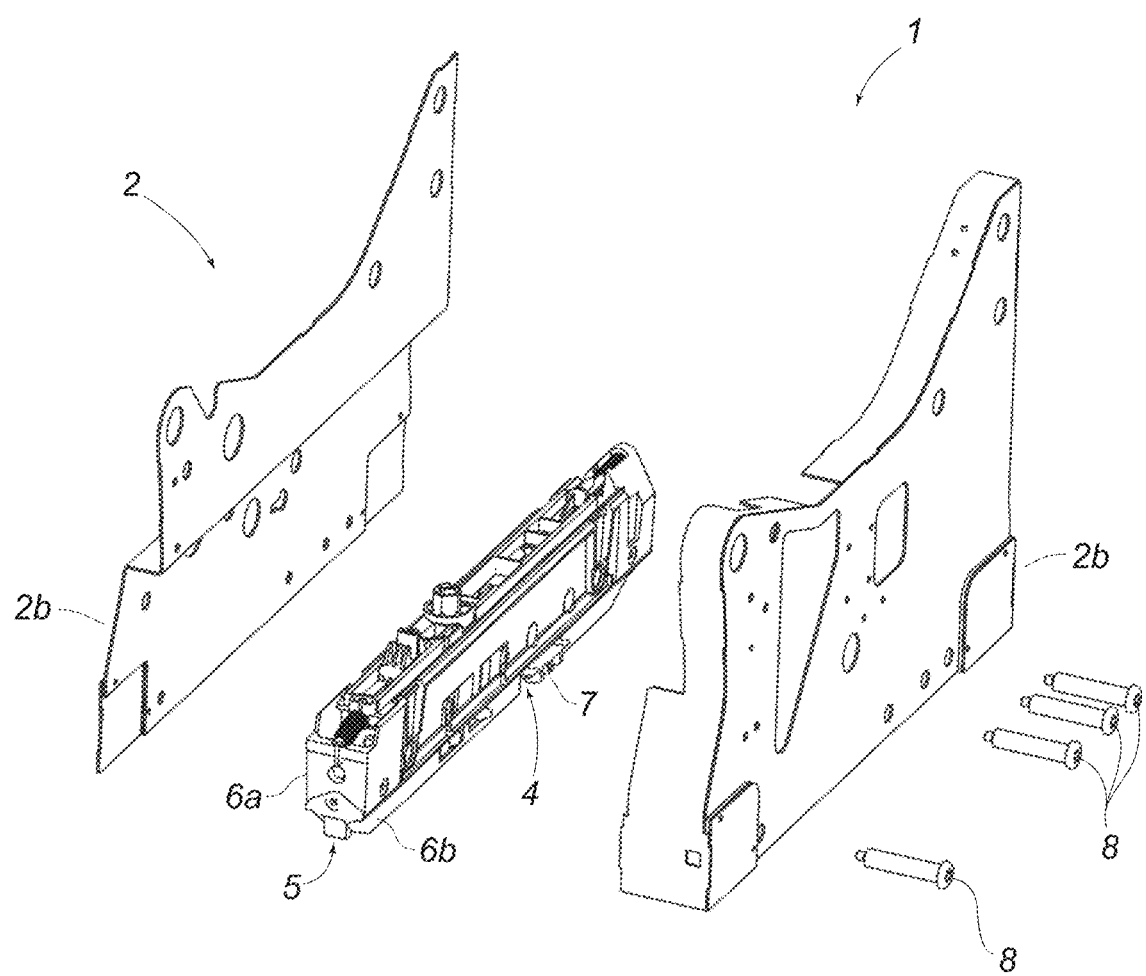
FIG. 3 is an exploded perspective view of an embodiment of a support member of a track assembly according to teachings of the present disclosure.

In embodiments, such as generally illustrated in FIGS. 1, 2, and 3, the track assembly 1 may include a first track 3, a second track 31, and/or a support member 5. The support member 5 may be selectively connected to the first track 3 and/or the second track 31. The track assembly 1 may, for example and without limitation, be disposed in a vehicle. The first track 3 and/or the second track 31 may be disposed on and/or connected to a mounting surface (e.g., a vehicle floor). The support member 5 may be configured to selectively engage the first track 3 and/or the second track 31. The support member 5 may be configured to move in the longitudinal direction along the first track 3 and/or the second track 31; and/or the support member 5 may be configured to move in the vertical direction relative to the first track 3 and/or the second track 31, such as if the support member 5 is removed from or connected to the tracks 3, 31.

With embodiments, the support member 5 may be connected to a connecting member 2 that may be configured to connect the track assembly 1 to a component 6, such as, for example and without limitation, a vehicle seat, console, and/or table. The connecting member 2 may include a first side member 2a and/or a second side member 2b. The first side member 2a and/or the second side member 2b may include one or more of a variety of shapes, sizes, and/or configurations. For example and without limitation, the first side member 2a and/or the second side member 2b may extend substantially in the vertical direction (e.g., the Z-direction). The support member 5 may be disposed at least partially between the first side member 2a and the second side member 2b. The first side member 2a, the second side member 2b, and/or the support member 5 may be configured to receive one or more connecting elements 8 (e.g., bolts, screws, rivets, etc.) to connect the first side member 2a and/or the second side member 2b to the support member 5.

Figure 4:
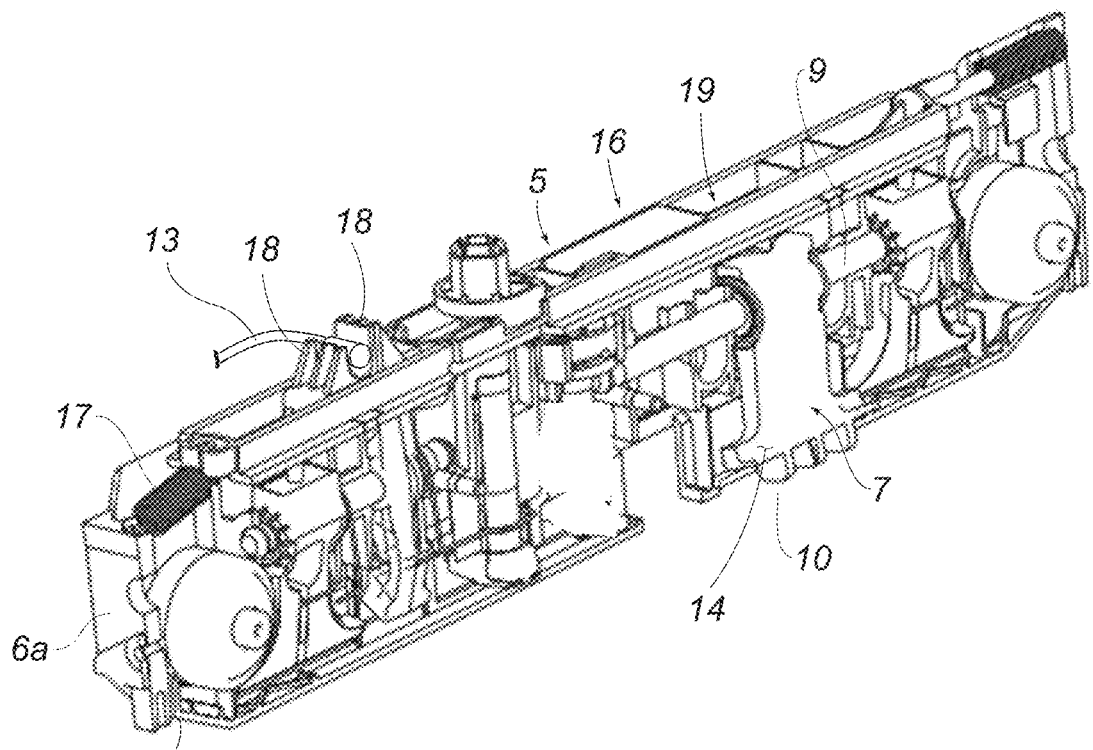
FIG. 4 is a perspective view of an embodiment of a support member of a track assembly according to teachings of the present disclosure.

In embodiments, such as generally illustrated in FIG. 4, the support member 5 may include an upper portion 6a and/or a lower portion 6b. The upper portion 6a and/or the lower portion 6b may include one or more of a variety of materials. For example and without limitation, the upper portion 6a and/or the lower portion may include metal and/or plastic. The lower portion 6b may be configured to engage the first track 3 and/or the second track 31. The lower portion 6b may support the first side member 2a and/or the second side member 2b (e.g., that may be connected to a component 6). The bottom portion may support the first side member 2a and/or the second side member 2b on the tracks 3, 31 when the support member 5 is connected to the tracks 3, 31. The lower portion 6b may include a width smaller than a width of the upper portion 6a, and/or the lower portion 6b may be disposed at least partially in the first track 3 and/or the second track 31. For example and without limitation, the lower portion 6b may be disposed at least partially in a gap 23 of the first track 3.

With embodiments, such as generally illustrated in FIG. 4, the support member 5 may include a slider 16. The slider 16 may be disposed at and/or connected to the upper portion 6a of the support member 5 (e.g., the slider 16 may be disposed on an upper face of the support member 5). The slider 16 may be configured to move in the X-direction (e.g., a longitudinal direction) relative to the support member 5. Movement of the slider 16 in the X-direction may selectively engage the support member 5 with the first track 3 and/or the second track 31. The slider 16 may include one or more hooks 18 that may be configured to engage an actuator 13. The actuator 13 (e.g., a cable, strap, lever, etc.) may be configured to move the slider 16 in the X-direction. The support member 5 may include one or more biasing members 17 (e.g., a spring) that may be configured to bias the slider 16 in the longitudinal direction. The slider 16 may include an aperture 19 that may be configured to move a lever 7 to selectively engage the support member 5 with the first track 3 and/or the second track 31. The lever 7 may contact the aperture 19 as the slider 16 may move in an X-direction (e.g., forward). The support member 5 may include a window 4 (e.g., an aperture) that the lever 7 may be configured to move through when engaging the first track 3 and/or the second track 31.

Figure 5:
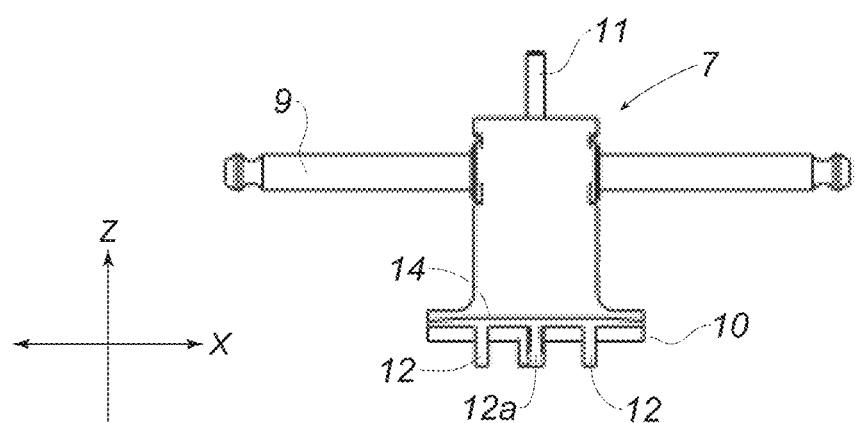
FIG. 5 is a side view of an embodiment of a lever according to teachings of the present disclosure.

In embodiments, such as generally illustrated in FIGS. 4 and 5, the support member 5 may include a lever 7 that may be configured to selectively engage the first track 3 and/or the second track 31. The lever 7 may include a head portion 10 that may include a protrusion 11 that may be configured to contact the aperture 19. The lever 7 may include a hooked portion 14 and/or at least one tooth 12. The tooth 12 and/or the hooked portion 14 may include one or more of a variety of materials. For example and without limitation, the tooth 12 and/or the hooked portion 14 may include metal and/or plastic. The tooth 12 may extend from the lever 7 in the transverse direction (e.g., the Y-direction) and/or such that the tooth 12 is substantially perpendicular to the X-direction. The tooth 12 may be substantially planar and/or rectangular. The tooth 12 may be configured to substantially limit movement of the support member 5 in the longitudinal direction (X-direction). The lever 7 may include more than one tooth, such as, for example and without limitation, three teeth 12 that may be parallel to each other. The teeth 12 may include a middle tooth 12a that may include a width greater than at least one other tooth 12.

In embodiments, the hooked portion 14 may be curved and/or may extend in the vertical direction (Z-direction) and/or the transverse direction (Y-direction). The hooked portion 14 may open upward, such as to engage and/or receive a wing 22 of the first track 3. The hooked portion 14 may be configured to substantially limit movement of the support member 5 in the vertical direction (Z-direction). The hooked portion 14 and/or the tooth 12 may be disposed substantially in the lower portion 6b of the support member 5. The hooked portion 14 may be configured to selectively engage the first track 3 and/or the tooth 12 may be configured to selectively engage the second track 31. The hooked portion 14 may be formed as a solid and/or continuous piece or may include a discontinuous configuration with a plurality of hooked sections.

With embodiments, such as generally illustrated in FIGS. 6, 7 and 8, the first track 3 may include a bottom wall 20, two side walls 21, and/or two wings 22. The wings 22 may be disposed at or about the top of the side walls 21 and may be disposed such that a gap 23 is present between the wings 22. The gap 23 may be configured to receive at least a portion of the lower portion 6b of the support member 5. The gap 23 may, for example and without limitation, include a width of about 15 mm to 25 mm (in the Y-direction). Undersides of the wings 22 may include ramped portions 25. The ramped portions 25 may form an acute angle with a top surface of the wings 22 such that the ramped portions 25 may form recesses in the undersides of the wings 22. The hooked portion 14 of the lever 7 may be aligned to contact at least one of the ramped portions 25 when the lever 7 is in the second position.

In embodiments, the second track 31 may be substantially disposed in the first track 3. The second track 31 may include one or more apertures 26 that may be configured to receive at least a portion of the one or more teeth 12 (see, e.g., FIG. 6). The apertures 26 may be spaced along the second track 31 in the X-direction. The apertures 26 may be substantially curved. For example, the apertures 26 may extend from a vertical portion of the second track 31 over a curved portion of the second track 31 such that apertures 26 may include a generally U-shaped configuration that may open downward. The apertures 26 may be configured such that a tooth 12 may move in the Y-direction and/or the Z-direction into and/or out of the apertures 26 (when the lever 7 moves from a first position to a second position). The apertures 26 may be disposed on one side and/or both sides of the second track 31. The first track 3 and/or the second track 31 may be formed as separate tracks (see, e.g., FIGS. 6 and 7) or may be formed as a combined track as a single/monolithic component (see, e.g., FIG. 8). The apertures 26 may be formed in the side walls 21 of the combined first track 3 and the second track 31.

Figure 9:
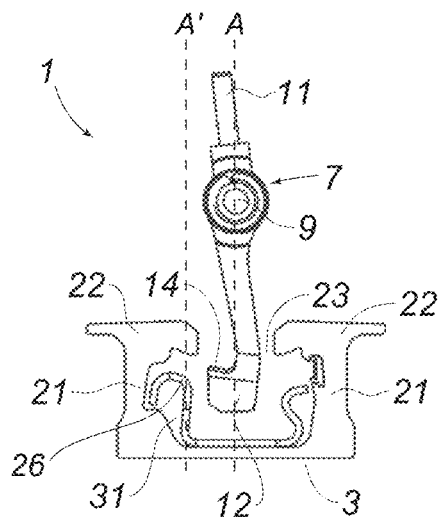
FIG. 9 is a section view of an embodiment of a first lever in a first position according to teachings of the present disclosure.
Figure 10:
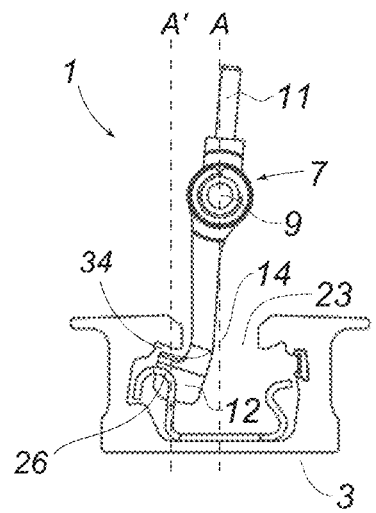
FIG. 10 is a section view of an embodiment of a first lever in a second position according to teachings of the present disclosure.
Figure 11:
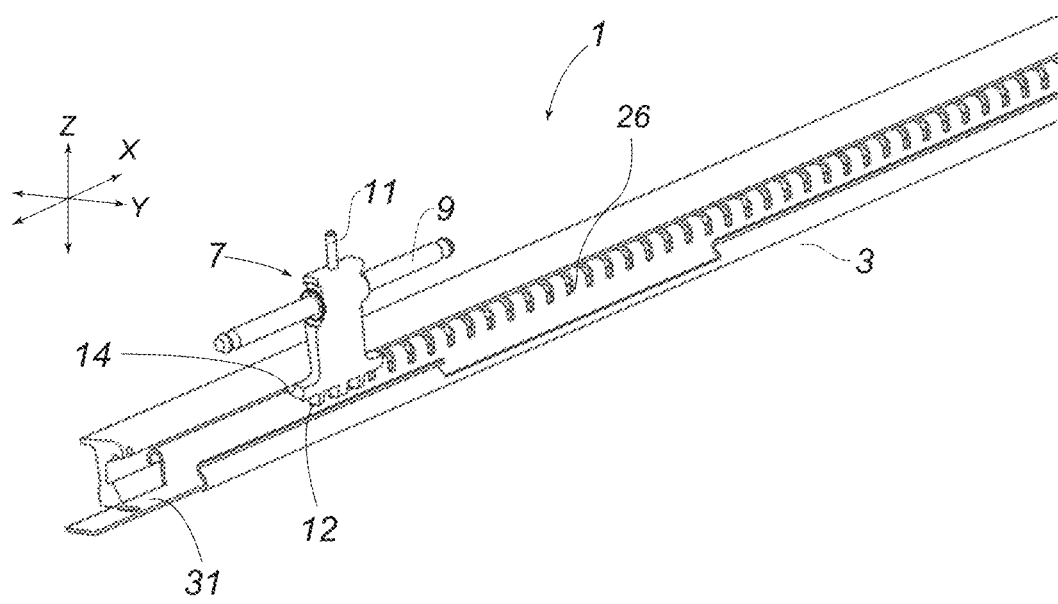
FIG. 11 is a perspective view of a portion of an embodiment of a track assembly according to teachings of the present disclosure.

With embodiments, the lever 7 may include a first position (see, e.g., FIG. 9), and/or a second position (see, e.g., FIGS. 10 and 11). The slider 16 may be configured to move the lever 7 between the first position and the second position. When the lever 7 is in the first position, the lever 7 may be configured to not substantially limit movement of the support member 5 in the X-direction and/or the Z-direction. When the lever 7 is in the first position, the lever 7 may be disposed substantially parallel to a vertical plane. When the lever 7 is in the second position, the lever 7 may be configured to substantially limit movement of the support member 5 in the X-direction and/or the Y-direction. When the lever 7 is in the second position, the lever 7 may, for example and without limitation, be disposed between about 8° to 15° from an X-Z plane (e.g., the hooked portion 14 and/or the tooth 12 may overlap with the first track 3 and/or a second track 31 in the Z-direction). The support member 5 may include a pin 9 about which and/or with which the lever 7 may rotate. The pin 9 may be substantially aligned with the X-direction. The slider 16 may move in the longitudinal direction which may cause the slider 16 to contact the protrusion 11, which may cause the lever 7 to rotate about a longitudinal axis (e.g., about the pin 9).

In embodiments, the protrusion 11 may extend from a top of the lever 7, the pin 9 may extend from and/or through a middle of the lever 7, and/or the tooth 12 and the hooked portion may be disposed at or about a bottom of the lever 7. When the lever 7 is in the first position, the lever 7 may intersect with a first vertical plane A (e.g., an X-Z plane). When the lever 7 is in the second position, the lever 7 may intersect with a second vertical plane A' (see, e.g., FIGS. 7 and 8). The first vertical plane A may be offset in the Y-direction from the second vertical plane A', such as by about 10 mm to 20 mm, for example and without limitation. The first vertical plane A may extend through bottom walls of the tracks 3, 31 and/or may extend through the gap 23. The second vertical plane A' may extend through the track 3 (e.g., through a wing 22) and/or the second track 31. For example and without limitation, the second vertical plane A' may extend through the wing 22 and one or more apertures 26 (e.g., the wing 22 and the apertures 26 may be at least partially aligned in a vertical/Z-direction). Such a configuration may reduce a travel distance of the lever 7 (e.g., a rotation angle), which may allow for the gap 23 to be smaller.

In embodiments, in the second position of the lever 7, a second gap 34 may be disposed between a top of the hooked portion 14 and the ramped portion 25. The second gap 34 may provide a degree of play in the Z-direction between the support member 5 and the first track 3, such as to compensate for manufacturing tolerances.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are intended to be inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

It is intended that all matter contained in the above description or shown in the accompanying drawings shall be interpreted as illustrative only and not limiting. Changes in detail or structure may be made without departing from the present disclosure.

What is claimed is:

1. A track assembly, comprising:
   a first track;
   a second track disposed substantially in the first track; and
   a support member including a lever;
   wherein the lever is configured to selectively engage the first track and the second track to limit longitudinal movement and vertical movement of the support member relative to the first track and the second track;
   the first track includes a first wing configured to contact the lever;
   the first track includes a second wing separated from the first wing in a transverse direction such that a gap is present between the first wing and the second wing;
   the lever and the support member are disposed at least partially in the gap;
   the second track includes an aperture configured to at least partially receive the lever; and
   the first wing and the aperture at least partially overlap in a vertical direction.

2. The track assembly of claim 1, wherein the lever is configured to rotate about an axis substantially aligned with a middle of the first track relative to the transverse direction.

3. The track assembly of claim 1, wherein the lever includes a tooth configured to contact the second track to limit longitudinal movement of the support member along the second track.

4. The track assembly of claim 3, wherein the tooth is configured to engage the aperture in the second track, the aperture extending over a curved portion of the second track.

5. The track assembly of claim 3, wherein the tooth is substantially planar and extends substantially perpendicular to a longitudinal direction.

6. The track assembly of claim 1, wherein
   the lever includes a first position in which the lever is substantially aligned with a longitudinal and vertical plane disposed between the first wing and the second wing in the transverse direction such that the lever does not restrict the vertical or the longitudinal movement of the support member;
   the lever includes a second position in which the lever is engaged with the aperture and the first wing to limit the longitudinal and vertical movement of the support member relative to the first track and the second track; and
   the lever is disposed at least partially in the gap in the first position and in the second position.

7. The track assembly of claim 1, wherein the lever includes a hooked portion configured to engage the first wing of the first track to limit the vertical movement of the support member;
   the first wing is disposed at a top of a side wall of the first track; and
   an underside of the first wing includes a ramped portion configured to contact the hooked portion.

8. The track assembly of claim 1, wherein the lever includes a first position and a second position;
   in the second position of the lever, the lever is configured to limit the longitudinal and vertical movement of the support member;
   in the first position of the lever, the lever does not substantially limit the longitudinal or vertical movement of the support member; and
   in the second position of the lever, at least a portion of the lever is disposed vertically between the first track and the second track.

9. The track assembly of claim 8, wherein, in the first position, the lever is configured to engage the aperture of the second track and the first wing of the first track.

10. A track assembly, comprising:
    a first track;
    a second track substantially disposed in the first track; and
    a support member, including:
    a lever; and
    a slider;
    wherein the slider is configured to move longitudinally into contact with the lever to selectively limit substantial vertical and longitudinal movement of the support member via the lever.

11. The track assembly of claim 10, wherein the lever is configured to contact a wing of the first track and an aperture of the second track to selectively and substantially limit the longitudinal and vertical movement of the support member relative to the first track and relative to the second track; and
    the wing and the aperture overlap in a vertical direction.

12. The track assembly of claim 11, wherein the lever includes a hooked portion configured to contact a ramped portion of an underside of the wing of the first track and limit the vertical movement of the support member.

13. The track assembly of claim 12, wherein the lever includes a tooth configured to contact the second track and limit the longitudinal movement of the support member.

14. The track assembly of claim 10, wherein the lever includes a first position and a second position; in the second position of the lever, the lever limits the longitudinal and vertical movement of the support member relative to the first track and the second track; and in the first position of the lever, the lever does not substantially limit the longitudinal and vertical movement of the support member relative to the first track and the second track.

15. A track assembly, comprising:
a track including a wing and an aperture; and
a support member configured to move along the track, the support member including:
a lever configured to engage the wing and the aperture; and
a slider;
wherein the lever includes a protrusion, and the slider is configured to move longitudinally to contact the protrusion and rotate the lever about a longitudinal axis to selectively limit substantial vertical and longitudinal movement of the support member relative to the track.

16. The track assembly of claim 15, wherein the slider includes a slider aperture, and the protrusion is configured to contact the slider aperture when rotating between a first position and a second position; and
wherein the wing and the aperture of the track overlap in a vertical direction.

17. The track assembly of claim 14, wherein in the second position of the lever, a vertical gap is disposed between a hooked portion of the lever and the first track.

18. The track assembly of claim 10, wherein the second track includes a plurality of apertures, and the lever includes a plurality of teeth.

19. The track assembly of claim 18, wherein at least one aperture of the plurality of apertures is configured such that a tooth of the plurality of teeth can move vertically and transversely through the aperture.

20. The track assembly of claim 14, wherein in the second position of the lever, at least a portion of the lever is disposed vertically between the first track and the second track.

* * * * *